(12) United States Patent
Subramanian

(10) Patent No.: US 9,074,540 B2
(45) Date of Patent: Jul. 7, 2015

(54) EXHAUST GAS RECIRCULATION SYSTEMS WITH VARIABLE VENTURI DEVICES

(75) Inventor: Rajkumar Subramanian, Columbus, IN (US)

(73) Assignee: Cummins Inc., Columbus, IN (US)

( * ) Notice: Subject to any disclaimer, the term of this patent is extended or adjusted under 35 U.S.C. 154(b) by 700 days.

(21) Appl. No.: 13/450,799

(22) Filed: Apr. 19, 2012

(65) Prior Publication Data

US 2013/0276766 A1 Oct. 24, 2013

(51) Int. Cl.
*F02M 25/07* (2006.01)
*F02D 41/00* (2006.01)
*F02D 41/14* (2006.01)

(52) U.S. Cl.
CPC ........ *F02D 41/0077* (2013.01); *F02M 25/0756* (2013.01); *F02M 25/0753* (2013.01); *F02M 25/0722* (2013.01); *F02D 41/0072* (2013.01); *F02D 2041/141* (2013.01); *F02D 2200/0406* (2013.01); *Y02T 10/47* (2013.01)

(58) Field of Classification Search
CPC .......... F02M 25/0753; F02M 25/0754; F02M 25/0756; F02M 25/0757; F02M 25/0771; F02M 25/0772; F02M 25/0787; F02D 41/0065
USPC ............. 123/568.11, 568.17, 568.18, 568.19, 123/568.21, 568.26
See application file for complete search history.

(56) References Cited

U.S. PATENT DOCUMENTS

| | | | |
|---|---|---|---|
| 5,031,596 A * | 7/1991 | Muraji | ......................... 123/463 |
| 5,611,204 A | 3/1997 | Radovanovic et al. | |
| 6,267,106 B1 | 7/2001 | Feucht | |
| 6,343,594 B1 | 2/2002 | Koeslin et al. | |
| 6,502,397 B1 | 1/2003 | Lundqvist | |
| 6,742,335 B2 | 6/2004 | Beck et al. | |
| 6,886,545 B1 | 5/2005 | Holm | |
| 7,036,529 B2 | 5/2006 | Berggren et al. | |
| 7,252,077 B2 | 8/2007 | Berggren | |
| 7,254,948 B2 * | 8/2007 | Gustafson et al. | .............. 60/611 |
| 7,261,096 B2 | 8/2007 | Berggren et al. | |
| 7,302,834 B2 | 12/2007 | Erlach et al. | |
| 7,320,220 B1 | 1/2008 | Atkinson | |
| 7,353,811 B2 | 4/2008 | Weisz | |
| 7,426,923 B2 | 9/2008 | Berggren | |
| 7,721,530 B2 | 5/2010 | Holm | |
| 7,886,727 B2 | 2/2011 | Ulrey et al. | |
| 2001/0013245 A1 * | 8/2001 | Hanashiro et al. | ............ 73/23.31 |
| 2004/0006978 A1 * | 1/2004 | Beck et al. | ....................... 60/289 |
| 2007/0199549 A1 * | 8/2007 | Weisz | ...................... 123/568.18 |
| 2010/0300413 A1 * | 12/2010 | Ulrey et al. | .................... 123/518 |
| 2013/0047959 A1 * | 2/2013 | Holm | ............................ 123/445 |

* cited by examiner

*Primary Examiner* — Thomas Moulis
(74) *Attorney, Agent, or Firm* — Taft Stettinius & Hollister LLP

(57) ABSTRACT

Systems, methods and techniques for exhaust gas recirculation are provided. The system includes a variable venturi device that connects an inlet air supply line and recirculating exhaust gas supply line to an intake manifold supply. A controller in communication with at least one pumping pressure sensor and a flow control element position sensor associated with the variable venturi mixing device is operable to determine a flow rate of the recirculating exhaust gas. The flow rate determination may be used to control $NO_x$ emissions during operation of the internal combustion engine.

20 Claims, 3 Drawing Sheets

EXHAUST GAS RECIRCULATION SYSTEMS WITH VARIABLE VENTURI DEVICES

FIELD OF THE INVENTION

The present invention relates generally to exhaust gas recirculation in internal combustion engines, and more particularly is concerned with systems, methods, and apparatus for exhaust gas recirculation with a variable venturi device during the operation of an internal combustion engine.

BACKGROUND

The production of noxious nitrogen oxides ($NO_x$) by internal combustion engines which pollute the atmosphere are undesirable and in many cases are controlled by regulations established by governmental entities. One method for limiting or controlling the combustion temperature of the engine and thus reduce $NO_x$ emissions has been to recirculate a portion of the exhaust gas back to the engine air intake to lower the oxygen content in the intake air. This reduces the combustion temperature of the intake charge and in turn reduces the amount of $NO_x$ formation during combustion due to lower flame temperatures.

In order to recirculate exhaust gas through an exhaust gas recirculation (EGR) line connecting the exhaust manifold to the intake air supply line, exhaust manifold pressure is maintained higher than the intake manifold pressure. However, this causes gas exchange pressure losses referred to as Pumping Mean Effective Pressure (PMEP). Furthermore, for operational efficiency the amount of exhaust gas to be recirculated should be varied based on operational conditions and the need to reduce $NO_x$ emissions. Therefore, systems and methods are needed to increase the efficiency of EGR systems by reducing PMEP and provide effective and reliable determinations of EGR flow rates for EGR control. The present invention is directed toward meeting these needs, among others.

SUMMARY

One embodiment is a unique method for determining and/or controlling EGR flow for an engine with an intake system including a variable venturi device that provides pumping for EGR flow to the intake manifold supply line. An additional embodiment is a unique method for determining and/or controlling EGR flow with a flow control element in a variable venturi device that mixes EGR flow with fresh air flow. Other embodiments include unique methods, systems, and apparatus to determine and control EGR flow. Further embodiments, forms, objects, features, advantages, aspects, and benefits shall become apparent from the following description and drawings.

DETAILED DESCRIPTION

Figure 1:
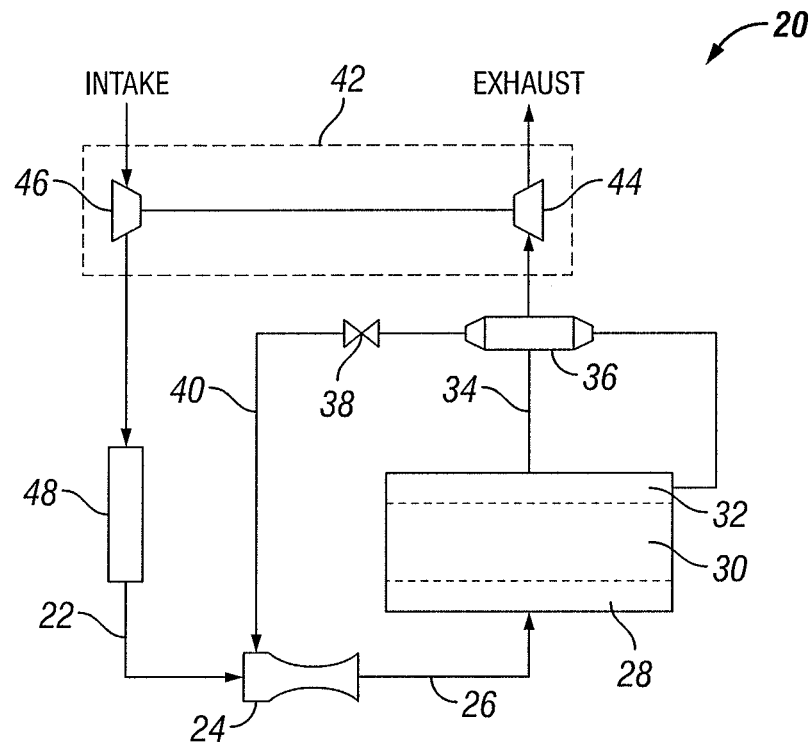
FIG. 1 is a schematic illustration of a system for controlling intake flow for an internal combustion engine.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention illustrated therein being contemplated as would normally occur to one skilled in the art to which the invention relates.

With reference to FIG. 1, a system 20 for controlling EGR flow is illustrated in schematic form. System 20 includes an inlet air supply conduit 22, a variable venturi device 24, an intake manifold supply conduit 26, an engine intake manifold 28, an engine 30, an engine exhaust manifold 32, an exhaust conduit 34, an EGR flow coupling 36, and an EGR valve 38. A recirculating exhaust gas supply conduit 40 extends from EGR flow coupling 36 to variable venturi device 24 to connect the exhaust manifold 28 to inlet air supply conduit 22. Inlet air supply conduit 22 and recirculating exhaust gas supply conduit 40 are flow coupled to variable venturi device 24. Variable venturi device 24 is flow coupled to engine intake manifold 28 through intake manifold supply conduit 26. Engine exhaust manifold 32 is flow coupled to EGR flow coupling 36 through exhaust conduit 34, and EGR valve 38 is flow coupled to flow coupling 36 and variable venturi device 24 through recirculating exhaust gas supply conduit 40.

In one embodiment, EGR flow coupling 36 includes an EGR valve, and may also include one or more intermediate flow passages, conduits or other structures. Exhaust conduit 34 extends from EGR flow coupling 36 to a turbine 44 of a turbocharger 42. Turbine 44 is connected to a compressor 46 flow coupled to inlet air supply conduit 22. Inlet air supply conduit 22 may include a charge air cooler 48 downstream from compressor 46 and upstream from variable venturi device 24. The components illustrated in FIG. 1 are not exclusive of all components and/or arrangements that may be included in system 20. Furthermore, one or more of the illustrated components in system 20 may be omitted.

In operation of system 20, fresh air is supplied through inlet air supply conduit 22. The supplied air can be filtered, unfiltered, and/or conditioned in any known manner. In one embodiment, ambient air is pressurized with compressor 46 and sent through charge air cooler 48 before delivery to variable venturi device 24. EGR valve 38 is operable to provide selective recirculation of a portion of exhaust gas from the engine 30 to variable venturi device 24. EGR valve 38 may be actuatable to control the proportion of exhaust gas that is recirculated, or may simply be an on/off type valve with proportion control provided exclusively by variable venturi device 24. Exhaust gas which is not recirculated through EGR valve 38 continues through exhaust conduit 34 to turbine 44 and then is outlet through a tail pipe or other structure to the atmosphere. The air flow through variable venturi device 24 provides a pumping effect that draws and mixes exhaust gas passing through EGR valve 38 with inlet air received from inlet air supply conduit 22, thus allowing reduction in the pressure differential between intake manifold 28 and exhaust manifold 32 and reducing gas exchange losses or PMEP. The air-exhaust gas mixture is then supplied to engine 30 through engine intake manifold 28 and intake manifold supply conduit 26.

In one embodiment, engine 30 is a turbocharged diesel engine. It should be understood that a variety of other types of engines and combustion devices are contemplated by additional embodiments including non-turbocharged diesel engines as well as engines which combust fuels other than diesel. Turbocharger 42 may be any suitable turbocharger known in the art, including variable-geometry turbine turbochargers and waste-gated turbochargers.

In operation, engine 30 produces a pre-EGR exhaust stream into exhaust conduit 34 and receives a charge flow from intake manifold supply conduit 26 comprising an intake air stream from inlet air supply conduit 22 mixed with an (EGR) stream from recirculating exhaust gas conduit 40. The engine 30 is fluidly coupled to intake manifold 28 and exhaust manifold 32, and the EGR stream passes through EGR valve 38. The recirculating exhaust gas conduit 40 is illustrated as exiting the exhaust conduit 34 at EGR coupling 38 between exhaust manifold 32 and turbine 44, but the conduit 40 may exit at any location downstream of the engine 30 and upstream of turbine 44.

Figure 2:
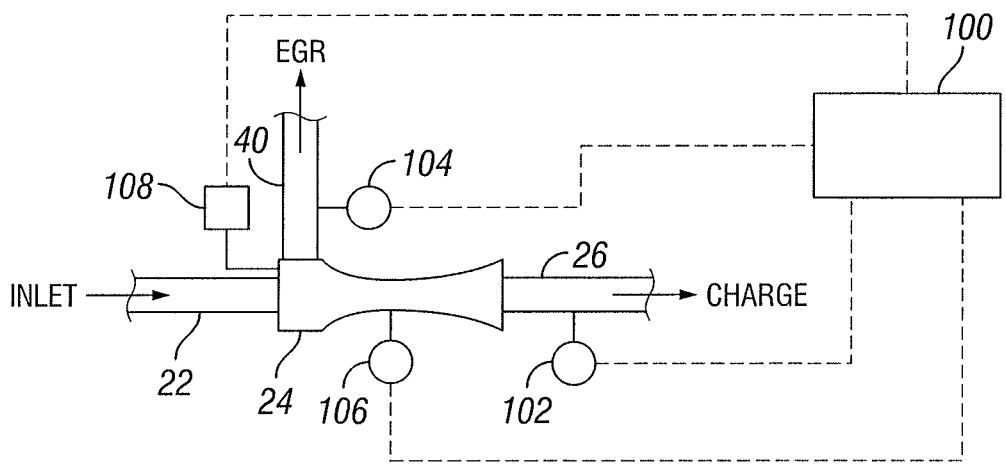
FIG. 2 is a schematic illustration of a recirculating exhaust gas supply line and an intake air supply line connected to an intake manifold supply line and a controller.

As shown in FIG. 2, the system 20 further includes a controller 100. The controller 100 structured to perform certain operations control the intake flow of the engine 30, including determining and controlling the flow rate of the EGR stream and controlling the flow rate of the charge flow. In certain embodiments, the controller 100 forms a portion of a processing subsystem including one or more computing devices having memory, processing, and communication hardware. The controller 100 may be a single device or a distributed device, and the functions of the controller may be performed by hardware or software. More specific descriptions of an exemplary embodiment of the controller 100 are provided in the section referencing FIG. 5.

Various sensors are contemplated to provide control signals indicative of operating parameters of system 20. In FIG. 2, there is shown a first pressure sensor 102 adjacent the outlet of variable venturi device 24 and a second pressure sensor 104 adjacent one of the inlets of variable venturi device 24 that receives EGR flow. Pressure sensors 102, 104 are in operative communication with controller 100. Pressure sensors 102, 104 provide an indication of the pumping pressure supplied by the inlet air flow moving through variable venturi device 24. In the illustrated embodiment, two pressure sensors 102, 104 are shown. In another embodiment, a differential pressure sensor is contemplated. Any pressure sensor arrangement which provides a control signal indicating the pumping pressure supplied by the inlet air flow through variable venturi device 24 is contemplated.

Also shown in FIG. 2 is a position sensor 106 connected to a flow control element 50 (FIG. 3) of variable venturi device 24 and also connected to controller 100. Sensor 106 is operable to provide an indication of a position of the flow control element in variable venturi device 24. An actuator controller 108 is operatively connected to the flow control element 50 and to controller 100 to receive an actuation signal from controller 100 to move flow control element 50 to a desired position in variable venturi device 24.

Figure 3:
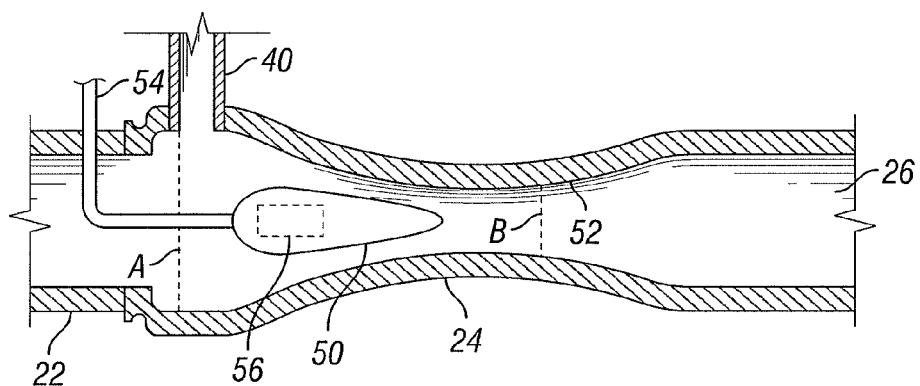
FIG. 3 is a schematic cross-sectional illustration of a variable venturi device connecting the recirculating exhaust gas supply line and the intake air supply line to the intake manifold supply line.

Referring now to FIG. 3, one example of a variable venturi mixing device 24 with a flow control element 50 is shown. It should be understood that the systems and techniques disclosed herein have application with any variable venturi mixing device and with any one of numerous exhaust gas recirculation systems. Further examples are disclosed in U.S. Pat. Nos. 7,886,727; 7,721,530; 7,426,923; 7,353,811; 7,320,220; 7,261,096; 7,252,077; 7,036,529; 6,502,397; 6,343,594; 6,267,106; 5,611,204; each of which is incorporated herein by reference.

Inlet air supply conduit 22 is connected to a first inlet to variable venturi device 24 and recirculating exhaust gas conduit 40 is connected to a second inlet of variable venturi device 24 that is positioned along a constricted portion 52 within variable venturi device 24. Constricted portion 52 forms in the direction of inlet air flow a convergent portion and a divergent portion that creates a venturi effect caused by the inlet air flow, and creating a pumping pressure to draw EGR flow into variable venturi device 24. The connection of conduit 40 can be arranged in any suitable manner, including the T connection as shown, a radial connection with one or more inlets to improve mixing of exhaust gas with fresh air flow, and at angles other than perpendicular. Flow control element 50 includes an elongated body tapered in a direction of inlet air flow through variable venturi device 24. An actuator 56 of flow control element 50 is connected to actuator controller 108. Actuator 56 is operable to move flow control element 50 along a guide member 54 at any location between limit positions A and B in variable venturi device 24. The ability to re-position flow control element 50 provides a variable effect to the flow of inlet air through variable venturi device 24 and thereby varies the pumping pressure supplied by variable venturi device 24 and the EGR flow that is obtained from recirculating exhaust gas conduit 40.

The flow of fresh air from inlet supply conduit 22 around flow control element 50 creates a venturi effect that lessens deterioration of the power of engine 30 while providing a means to regulate EGR. Maximizing the throttling of fresh air flow in variable venturi device 24 at the inlet of exhaust gases from recirculating exhaust conduit 40 provides the maximum pumping effect, resulting in smaller pressure losses and improving break thermal efficiency of engine 30.

Actuator 56 can be regulated by hydraulic or pneumatic means that is available on commercial vehicles through the braking system or other source. In the embodiment shown in FIG. 3, actuator 56 is integrated with the flow control element 50. For example, actuator 56 can be located inside flow control element 50 or mounted outside device 24 and linked to flow control element with a linkage or other suitable means. In the illustrated embodiment, flow control element 50 can be moved forward and backwards between limits A and B by variation of the pressure in the guide member 54 connected to actuator 56.

Figure 4:
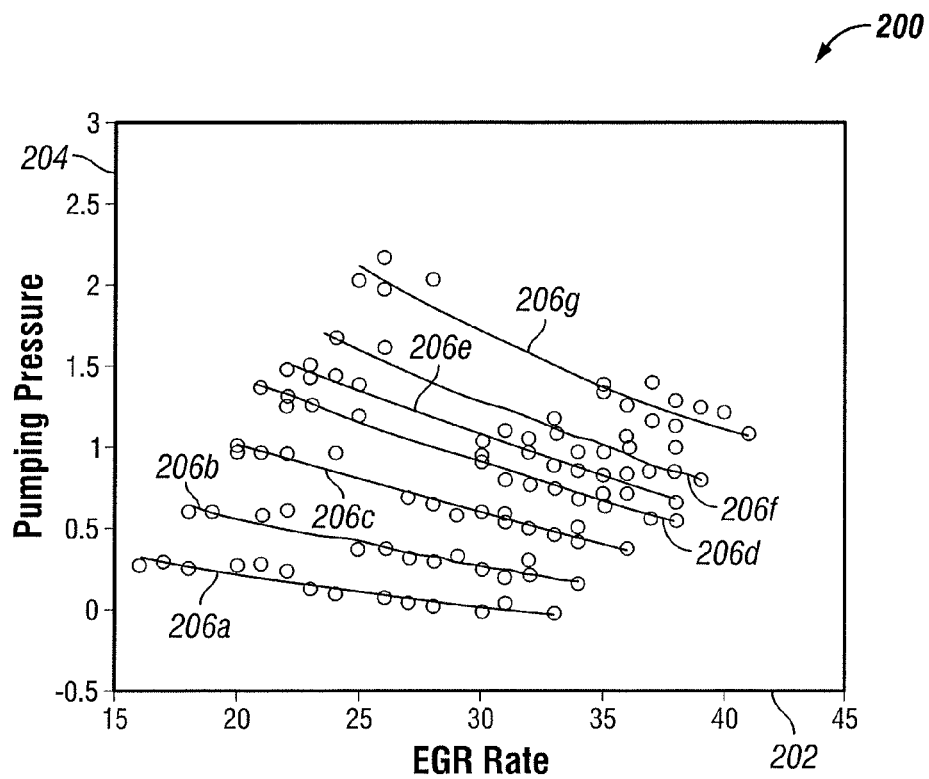
FIG. 4 is an illustration of interactions between EGR flow, pumping pressure, and variable venturi device flow control element position.

FIG. 4 is an illustration 200 of interactions between EGR flow rate 202 and pumping pressure 204 at various positions 206a-g of flow control element 50 between limits A and B in variable venturi device 24. The data in FIG. 4 is illustrative for one engine configuration only, and will vary with the specific hardware for a given system. However, the general character of the data in the illustration 200 is broadly applicable to many engine configurations having an EGR system and variable venturi device. The type of data shown in FIG. 4 can be generated for a given system with the benefit of the disclosures herein, for example, by sweeping pumping pressures at selected fixed flow control element positions. It is seen in FIG. 4 that changes in the EGR flow rate can be adjusted by changes in the pumping pressure and/or changes in the flow control element positioning in variable venturi device 24. Therefore, for any known position of flow control element 50 at a measured pumping pressure, the EGR flow rate can be determined without the expanse and complexity associated with an EGR flow measurement sensor or unit.

Figure 5:
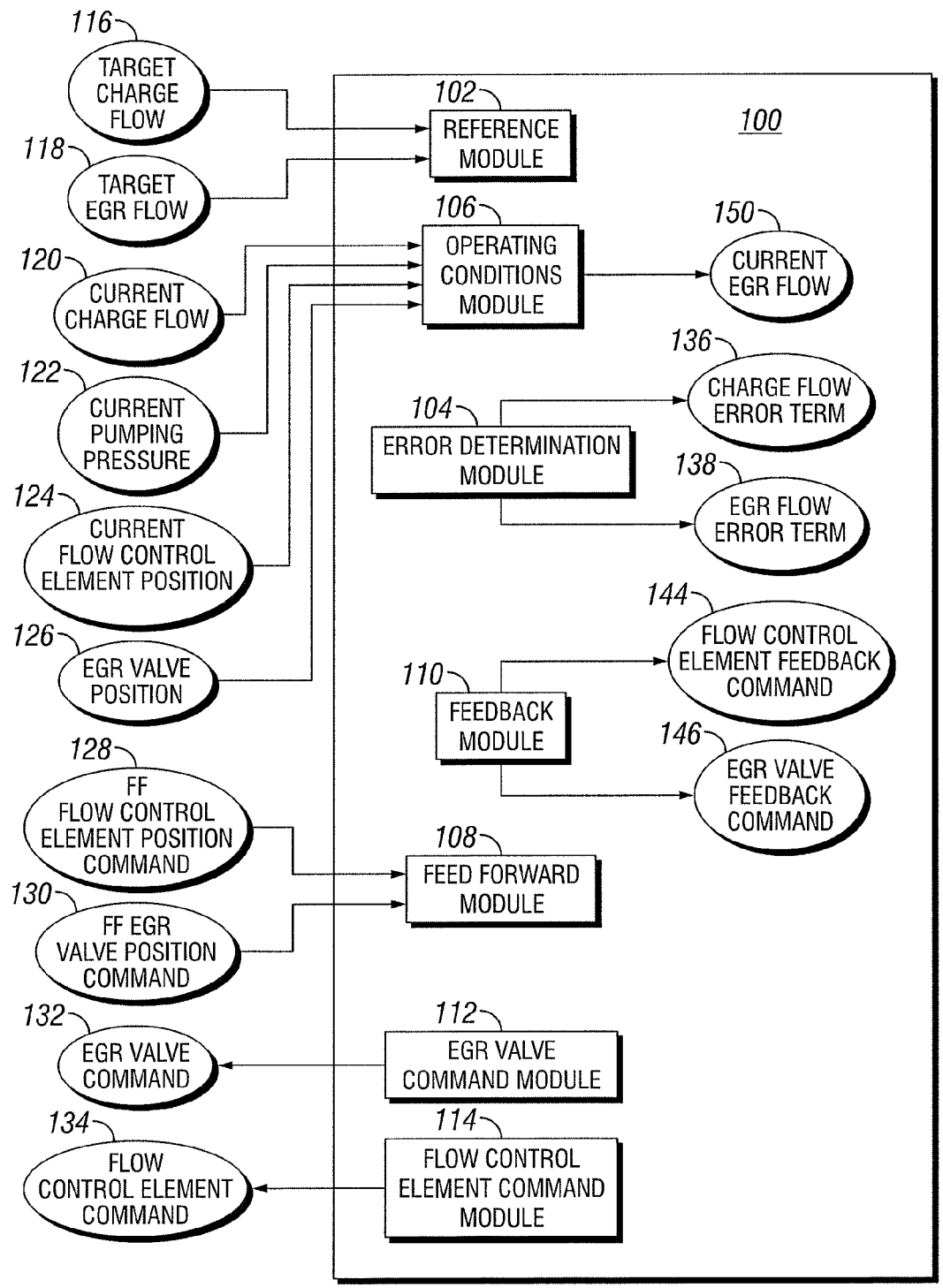
FIG. 5 is a schematic of a controller for controlling intake flow for an internal combustion engine.

FIG. 5 is a schematic illustration of controller 100 for controlling intake flow for internal combustion engine 30.

The controller 100 includes modules structured to functionally execute operations for controlling the intake flow for the engine 30. The description herein includes the use of modules to highlight the functional independence of the features of the elements described. A module may be implemented as operations by software, hardware, or at least partially performed by a user or operator. In certain embodiments, modules represent software elements as a computer program encoded on a computer readable medium, wherein a computer performs the described operations when executing the computer program. A module may be a single device, distributed across devices, and/or a module may be grouped in whole or part with other modules or devices. The operations of any module may be performed wholly or partially in hardware, software, or by other modules. The presented organization of the modules is exemplary only, and other organizations that perform equivalent functions are contemplated herein.

The controller 100 includes a reference module 102 that interprets a target charge flow 116 and a target EGR flow 118. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

The controller 100 further includes an operating conditions module 106 that interprets a current charge flow 120, a current pumping pressure 122, a flow control element position 124, and, in one embodiment, an EGR valve position 126. Current values, as utilized herein, refer to values in close temporal relation to the operating time of the controller 100, but the current values need not be absolutely contemporaneous. For example, and without limitation, a current value may be a value from a prior execution cycle of the controller 100, a last known reliable value, a value that was most recently saved on a computer readable medium, or other value that generally represents a latest known value for the parameter which is "current."

Operating conditions module 106 is further operable to determine a current EGR flow 150 based on current pumping pressure 122 and current flow control element position 124. As discussed above, current EGR flow 150 can be based on a table, operating map, chart, or algorithm, for example, stored in a memory of controller 100 that relates current pumping pressure and flow control element position to determine current EGR flow rate for a given system 20. In a further embodiment, the EGR valve position 126 is further determined and included in the chart, table operating map or algorithm relating current pumping pressure to flow control element position for a given EGR valve position to determine current EGR flow 150.

The controller 100 further includes an error determination module 104 that determines a charge flow error term 136 in response to the current charge flow 120 and the target charge flow 116, and determines an EGR flow error term 138 in response to the target EGR flow 118 and the current EGR flow 150. Error determination module 104 determines the charge flow error term 136 by subtracting the current charge flow 120 from the target charge flow 116. Error determination module 104 further determines the EGR flow error term 138 by subtracting current EGR flow 150 from target EGR flow 118. The controller 100 further includes a feedback module 110 that determines a flow control element feedback command 144 and an EGR valve feedback command 146 in response to the charge flow error term 136 and the EGR flow error term 138.

The controller 100 further includes a feedforward module 108 that interprets a feedforward flow control element position command 128 and, in one embodiment, a feedforward EGR valve position command 130. The feedforward commands 128, 130 may be provided by stored open-loop data, according to a model of the system 20, according to default steady state values the determine values for a position of flow control element 50 and, in one embodiment, a position of EGR valve 38 to achieve the target charge flow 116 and target EGR flow 118, or by any other feedforward control mechanism understood in the art. The controller 100 further includes a flow control element position command module 114 that determines a flow control element position command 134 in response to the flow control element feedback command 146 and the feedforward flow control element position command 128. In certain embodiments, the controller 100 further includes an EGR valve command module 112 that determines an EGR valve command 132 in response to the EGR valve feedback command 146 and the feedforward EGR valve position command 130.

The feedforward commands 128, 130 are determined by any method understood in the art, including at least modeling of the system and/or test data from steady state operating points. The feedforward commands 128, 130 are the preferred operating points of the system according to the target charge flow 116 and target EGR flow 118, and may be selected, without limitation, to provide desired system fuel economy, emissions characteristics, and/or preferred hardware operating positions. In certain embodiments, the feedforward commands 128, 130 may be omitted at certain operating regions of the engine, and/or omitted entirely. Where the feedforward commands 128, 130 are omitted, the system 100 operates only with feedback control according to the feedback commands 144, 146.

Controller 100 is operable to provide control signals for controlling intake flow for internal combustion engine 30. The intake flow is the current charge flow 120, and/or a fresh air intake combined with the current EGR flow 150, or equivalent streams that together describe the amount and composition of the charge flow 120. The controller 100 determines the target charge flow 116 and the target EGR flow 118 in reference module 102 according to engine and exhaust system operating parameters and emissions parameters, which parameters are known to those skilled in the art. Controller 100 is operable to provide commands to actuator controller 108 to move or position flow control element 50 in variable venturi device 24 according to flow control element command 134 to achieve the target charge flow 116 and target EGR flow 118. Controller 100 is further operable in certain embodiments to provide commands to an actuator of EGR valve 38 according to EGR valve command 132 to provide additional control for EGR flow.

As is evident from the figures and text presented above, a variety of embodiments according to the present invention are contemplated.

One exemplary embodiment is a method for determining a recirculated exhaust gas flow rate, comprising: determining a pumping pressure for the recirculated exhaust gas created by a variable venturi mixing device that fluidly mixes the recirculated exhaust gas with a fresh air supply; determining a position of a flow control element within the variable venturi mixing device; and determining the flow rate of the recirculated exhaust gas as a function of the pumping pressure and the position of the flow control element.

Various refinements of this embodiment are contemplated. For example, the method may include adjusting a position of the flow control element to change the flow rate of the recirculated exhaust gas. In another example, the flow rate of the recirculated exhaust gas is determined without a flow rate sensor. In yet another example, the flow control element is connected to an actuator. A signal provided to the actuator adjusts the position of the flow control element to a predetermined position to achieve a target charge flow. The then current flow rate of the recirculated exhaust gas can then be determined as a function of the pumping pressure and the predetermined position of the flow control element. In another example, determining the flow rate of the recirculated exhaust gas includes determining the flow rate from stored data providing recirculated exhaust gas flow rates according to current pumping pressures and flow control element positions.

In another embodiment, an exhaust gas recirculation system is provided. The system includes an inlet air supply line, an internal combustion engine, a recirculating exhaust gas supply line connected to an exhaust manifold of the internal combustion engine, an intake manifold supply line connected to an intake manifold of the internal combustion engine, and a variable venturi mixing device connecting the inlet air supply line and the recirculating exhaust gas supply line to the intake manifold supply line. Air entering through the inlet air supply line and exhaust gas entering though the recirculating exhaust gas supply line mix in the variable venturi mixing device to create a mixture of air and exhaust gas to the intake manifold supply line, and the variable venturi mixing device including a flow control element movably positioned therein. The system also includes a controller operable to determine a flow rate of the recirculating exhaust gas flowing through the recirculating exhaust gas supply line as a function of a current position of the flow control element and a pumping pressure for the recirculating exhaust gas created by the variable venturi mixing device.

In one refinement of this embodiment, an actuator for moving the flow control element in the variable venturi mixing device to control a proportion of air versus recirculating exhaust gas in the air and exhaust gas mixture is provided. In another refinement, the flow rate of the recirculating exhaust gas is determined without a flow rate sensor in the recirculating exhaust gas supply line. In yet another refinement, a control valve in the recirculating exhaust gas supply line upstream of the variable venturi mixing device is provided. In another refinement, the flow control element of the variable venturi mixing device comprises an elongated tapered body arranged to be displaced in a longitudinal direction of air flow in the inlet air supply line in order to vary a venturi effect of inlet air flow through the variable venturi device and to control the proportion of recirculating exhaust gas versus air in the mixture of air and exhaust gas and an actuator which displaces the valve body in the longitudinal direction in response to a the control signal. In a further refinement, the recirculating exhaust gas supply line is connected to a constricted flow portion of the variable venturi device and the flow control element is located in the constricted portion.

In another refinement of this embodiment, the controller includes a reference module structured to interpret a target charge flow to the internal combustion engine and a target EGR flow to the variable venturi device, an operating conditions module structured to interpret the current charge flow, the current pumping pressure and the position of the flow control element and determine the flow rate of the recirculating exhaust, an error determination module structured to determine a charge flow error term in response to the difference between the target charge flow and the current charge flow and to determine an EGR flow error term in response to the difference between the target EGR flow and the flow rate of the recirculating exhaust gas, and a feedback module structured to determine a flow control element feedback command in response to the charge flow error term and EGR flow error term. In one further refinement, the controller further includes a feedforward module structured to determine a feedforward flow control element position command in response the flow control element feedback command and the target charge flow and target EGR flow. In another refinement, the controller includes a flow control element command module structured to determine a flow control element command to change the position of the flow control element in response to the flow control element feedback command.

According to another embodiment, a control system for controlling an exhaust gas recirculation system is provided. The control system includes a controller operable to receive a signal indicative of a current position of a flow control element of a variable venturi device where the variable venturi device connects an inlet air supply line and a recirculating exhaust gas supply line to an intake manifold supply line. The control system also includes at least one sensor operable to generate a signal indicative of a current pumping pressure of the variable venturi device that draws recirculating exhaust gas from the recirculating exhaust gas supply line into the intake manifold supply line. The controller is in communication with the at least one sensor and operable to receive the sensor signal indicative of the sensed pumping pressure. The controller is operable to generate a control signal based at least in part on a current flow rate of the recirculating exhaust gas determined according to the current position of the flow control element and the current pumping pressure.

In one refinement of this embodiment, the controller is further operable to communicate the control signal to an actuator to change the current position of the flow control and adjust the flow rate of the recirculating exhaust gas. In a further refinement, the controller is operable to generate a second control signal based at least in part on a second current flow rate of the recirculating exhaust gas determined according to the changed position of the flow control element and the resulting current pumping pressure. In another refinement, the current flow rate of the recirculated exhaust gas is determined from data stored in a memory of the controller that provides a recirculated exhaust gas flow rate that corresponds to respective ones of a plurality of pumping pressures and flow control element positions While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method for determining a recirculated exhaust gas flow rate, comprising:
   determining a pumping pressure for the recirculated exhaust gas created by a variable venturi mixing device that fluidly mixes the recirculated exhaust gas with a fresh air supply;
   determining a position of a flow control element within the variable venturi mixing device; and
   determining the flow rate of the recirculated exhaust gas as a function of the pumping pressure and the position of the flow control element.

2. The method of claim 1, further comprising adjusting a position of the flow control element to change the flow rate of the recirculated exhaust gas.

3. The method of claim 1, wherein the flow rate of the recirculated exhaust gas is determined without a flow rate sensor.

4. The method of claim 1, wherein the flow control element is connected to an actuator.

5. The method of claim 4, further comprising providing a signal to the actuator to adjust the position of the flow control element to a predetermined position to achieve a target charge flow.

6. The method of claim 5, further comprising determining the flow rate of the recirculated exhaust gas as a function of the pumping pressure and the predetermined position of the flow control element.

7. The method of claim 1, wherein determining the flow rate of the recirculated exhaust gas includes determining the flow rate from stored data providing recirculated exhaust gas flow rates according to current pumping pressures and flow control element positions.

8. An exhaust gas recirculation system, comprising:
   an inlet air supply line;
   an internal combustion engine;
   a recirculating exhaust gas supply line connected to an exhaust manifold of the internal combustion engine;
   an intake manifold supply line connected to an intake manifold of the internal combustion engine;
   a variable venturi mixing device connecting the inlet air supply line and the recirculating exhaust gas supply line to the intake manifold supply line, wherein air entering through the inlet air supply line and exhaust gas entering though the recirculating exhaust gas supply line mix in the variable venturi mixing device to create a mixture of air and exhaust gas to the intake manifold supply line, the variable venturi mixing device including a flow control element positioned therein that is movable to any one of a plurality of positions; and
   a controller operable to determine a flow rate of the recirculating exhaust gas flowing through the recirculating exhaust gas supply line as a function of a current position of the flow control element and a current pumping pressure for the recirculated exhaust gas created by the variable venturi mixing device.

9. The system of claim 8, further comprising an actuator for moving the flow control element in the variable venturi mixing device to control a proportion of air versus recirculating exhaust gas in the air and exhaust gas mixture.

10. The system of claim 8, wherein the flow rate of the recirculating exhaust gas is determined without a flow rate sensor in the recirculating exhaust gas supply line.

11. The system of claim 8, further comprising a control valve in the recirculating exhaust gas supply line upstream of the variable venturi mixing device.

12. The system of claim 8, wherein the flow control element of the variable venturi mixing device comprises an elongated tapered body arranged to be displaced in a longitudinal direction of air flow in the inlet air supply line in order to vary a venturi effect of inlet air flow through the variable venturi device and to control the proportion of recirculating exhaust gas versus air in the mixture of air and exhaust gas and an actuator which displaces the valve body in the longitudinal direction in response to the control signal.

13. The system of claim 12, wherein the recirculating exhaust gas supply line is connected to a constricted flow portion of the variable venturi device and the flow control element is located in the constricted portion.

14. The system of claim 8, wherein the controller includes:
   a reference module structured to interpret a target charge flow to the internal combustion engine and a target EGR flow to the variable venturi device;
   an operating conditions module structured to interpret the current charge flow, the current pumping pressure and the position of the flow control element and determine the flow rate of the recirculating exhaust;
   an error determination module structured to determine a charge flow error term in response to the difference between the target charge flow and the current charge flow and to determine an EGR flow error term in response to the difference between the target EGR flow and the flow rate of the recirculating exhaust gas; and
   a feedback module structured to determine a flow control element feedback command in response to the charge flow error term and EGR flow error term.

15. The system of claim 14, wherein the controller includes:
   a feedforward module structured to determine a feedforward flow control element position command in response the flow control element feedback command and the target charge flow and target EGR flow.

16. The system of claim 14, wherein the controller includes:
   a flow control element command module structured to determine a flow control element command that changes the position of the flow control element in response to the flow control element feedback command.

17. A control system for controlling an exhaust gas recirculation system, said control system comprising:
   a controller operable to receive a signal indicative of a current position of a flow control element of a variable venturi device, wherein the variable venturi device connects an inlet air supply line and a recirculating exhaust gas supply line to an intake manifold supply line;
   at least one sensor operable to generate a signal indicative of a current pumping pressure of the variable venturi device that draws recirculating exhaust gas from the recirculating exhaust gas supply line into the intake manifold supply line; and
   wherein the controller is in communication with the at least one sensor and operable to receive the sensor signal indicative of the sensed pumping pressure, the controller further being operable to generate a control signal based at least in part on a current flow rate of the recirculating exhaust gas determined according to the current position of the flow control element and the current pumping pressure.

18. The system of claim 17, wherein the controller is further operable to communicate the control signal to an actuator to change the current position of the flow control and adjust the flow rate of the recirculated exhaust gas.

19. The system of claim 18, wherein the controller is operable to generate a second control signal based at least in part on a second current flow rate of the recirculating exhaust gas determined according to the changed position of the flow control element and the resulting current pumping pressure.

20. The system of claim 17, wherein the current flow rate of the recirculated exhaust gas is determined from data stored in a memory of the controller that provides a recirculated exhaust gas flow rate that corresponds to respective ones of a plurality of pumping pressures and flow control element positions.

\* \* \* \* \*